PROCESS FOR ELECTROLESS PLATING OF ABS RESINS

Filed Dec. 21, 1970 2 Sheets-Sheet 1

INVENTOR.
EILEEN MAGUIRE
LEON A. KADISON
BY
ATTORNEYS

United States Patent Office 3,689,303

Patented Sept. 5, 1972

3,689,303

PROCESS FOR ELECTROLESS PLATING OF ABS RESINS

Eileen Maguire, San Gabriel, and Leon A. Kadison, Pasadena, Calif., assignors to Crown City Plating Company Filed Dec. 21, 1970, Ser. No. 99,956
Int. Cl. B44d 1/092; C23c 3/02
U.S. Cl. 117—47 A 10 Claims

ABSTRACT OF THE DISCLOSURE

Conditioning the surface of an ABS resin by oxidation to increase its hydrophilic nature prior to contact with an organic pre-etch solution, eliminates surface blemishes when the resin is subsequently electrolessly plated.

BACKGROUND OF THE INVENTION

The present invention relates to electroless plating of the acrylonitrile - butadiene - styrene resins (hereinafter called ABS resins) and more particularly toward improving the surface appearance of an electroless plated ABS resin substrate.

Considerable demand exists for metal plating on nonconductive particles, particularly plastic articles. In the finished product the desirable characteristics in the plastic and the metal are combined to offer, thereby, the technical and aesthetic advantages of each.

For instance, the easily formed high impact strength of articles fabricated from ABS resins may be aesthetically and technically enhanced by metal coating. Although ABS resins, like most plastics, are electrically non-conductive, a metal bond to the surface can be established by initial plating operation known as electroless plating. This has been accomplished by conditioning the surface for plating by etching with a strong oxidizing acid, seeding the surface with a noble metal salt, for example, a palladium chloride solution, then immersing the seeded surface in an autocatalytic electroless solution wherein initial coating of the conductive metal ,e.g., copper and nickel, is established by chemical deposition. The metal coating acts as a buss, which allows a thicker metal coating to be built up electrolytically.

Adhesion between the metal plate and the ABS resin substrate is, however, dependent upon the strength of the metal-resin bond and adhesion to resin surfaces, even so-called platable grades of ABS resins, has been fairly poor. It has been observed, however, that bond strength can be improved by organically pre-etching the surface prior to etching with the strong acid. While bond strengths have been improved, organic pre-etching has been observed for many operations to have an adverse effect on surface appearance.

Automated, electroless plating operations involve the use of a plurality of tanks, in series, containing the several conditioning and cleansing solutions which the resin must contact in the course of the electroless plating operation. The articles to be plated are mounted on a rack which is progressively advanced from tank to tank. When the racked articles are withdrawn from the tank a definite transfer time must elapse before the article is brought into contact with the solution in the next succeeding tank.

It has been observed that when an ABS resin is organically pre-etched there is incomplete drainage of the pre-etch solution from the articles when they are withdrawn from the pre-etch tank, some of the solution remaining on the surface of the article in the form of tiny droplets. These droplets continue to etch the article during the transfer time and while the article is exposed to air. When the article is subsequently electrolessly plated, there appears tiny depressions or defects on the article surface. These defects, in substance, are blemishes which are particularly apparent on flat surfaces.

SUMMARY OF THE INVENTION

It has now been found that pre-conditioning the surface of an ABS resin article by contact with an oxidizing media to increase the hydrophilic nature of the surface prior to contacting the article with an organic pre-etch solution causes the organic pre-etch solution to sheet and completely drain from the surface of the ABS resin article when it is withdrawn from the organic pre-etch solution eliminating, thereby, surface defects or blemishes.

Pre-conditioning is preferably accomplished by contacting the ABS resin article with an oxidizing acid such as sulfuric acid, chromic acid or mixtures thereof. In a preferred operation, contact time is from about one to about three minutes, at a temperature of from about 125° F. to the softening point of the resin, preferably from about 140° F. to about 160° F.

Following pre-conditioning with the oxidizing media, preconditioned articles are rinsed to prevent acid from being brought into the organic pre-etch solution. After pre-etch with the organic solution, the ABS resin article is then progressed, free of defects, through an electroless plating operation in a conventional manner.

DRAWINGS

DESCRIPTION

According to the present invention, there is provided a process for improving the surface appearance of the electroless plated ABS resin articles. The process comprises increasing the hydrophilic character of the surface by contact with an oxidizing media prior to contact with an organic pre-etch solution in an electroless plating operation schematically shown in FIG. 1.

The hydrophilic nature of the surface may be increased in accordance with the practice of this invention by contacting the ABS resin surface with the media which is oxidizing with respect to the points of surface unsaturation to make the surface, which is normally hydrophobic, more hyrophilic. Among the media which may be mentioned as oxidizing, with respect to the points of unsaturation, there may be mentioned nitric acid, sulfuric acid, chromic acid, mixtures of sulfuric and chromic acid, alkaline permanganate solutions and the like. Because they are commonly found in electroless plating operations, sulfuric acid, chromic acid and mixtures thereof are particularly preferred.

As will be appreciated by one skilled in the art, caution in selecting the oxidizing media should be taken so as to avoid the use of the media which will undermine the surface of the resin and decrease, thereby, bond strength of the electrolessly deposited metal. There may, for instance, be used as a pre-conditioning solution the same solution used for the oxidizing etch following the organic pre-etch operation.

Figure 2:
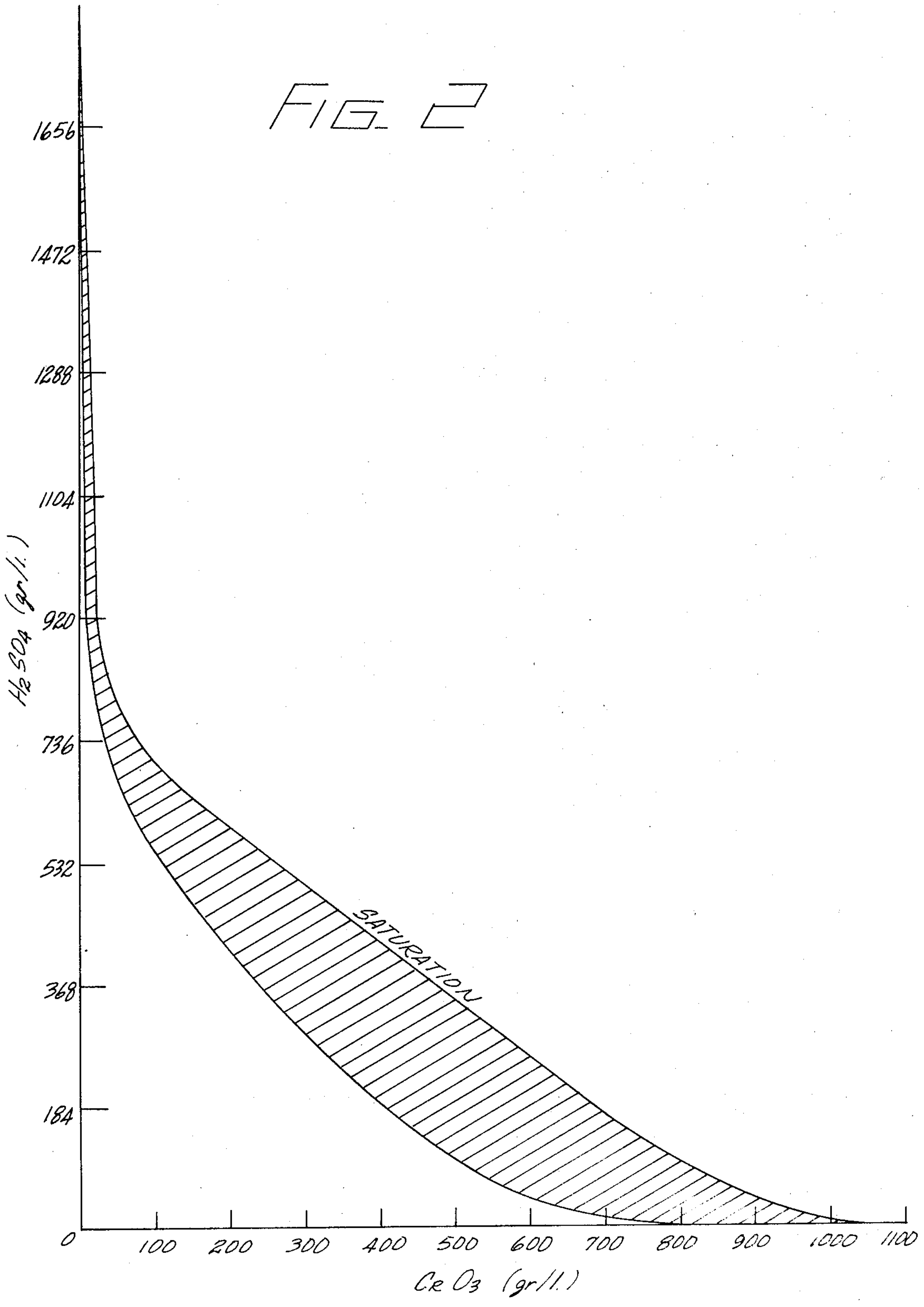
FIG. 2 is a graph illustrating the $H_2SO_5$–$CrO_3$ ratios employed in the preferred pre-conditioning solutions of this invention.

We have found that excellent results are obtained using sulfuric acid-chromic acid solutions defined by the shaded area of FIG. 2. Solutions defined by the shaded area will render an ABS resin surface hydrophilic within about 3 minutes at 150° F. The approximate upper and lower chromic acid ($CrO_3$) concentrations for these preferred solutions as a function of sulfuric acid concentration is shown in Table 1 below.

TABLE 1

| $H_2SO_4$ (g./l.) | $CrO_3$ (g./l.) Upper (sat.) | Lower |
|---|---|---|
| 0 | 1,040 | |
| 46 | 900 | 600 |
| 92 | 800 | 520 |
| 184 | 680 | 400 |
| 368 | 472 | 240 |
| 552 | 250 | 135 |
| 736 | 80 | 40 |
| 920 | 20 | 10 |
| 1,840 | 0 | |

The stronger solutions, namely, solutions of higher $CrO_3$ content or close to the saturation line can be expected to act faster or be active at lower temperatures. Supersaturated solutions may also be used, but little benefit can be obtained by using them. Solutions having compositions outside the unshaded area and generally in the lower left hand corner of FIG. 2, may also be used but may require longer contact times and/or higher temperatures. The preferred pre-conditioning solution comprises 540 grams per liter chromic acid and 184 grams per liter sulfuric acid.

The time required to condition the surface will depend, in part, on the activity of oxidizing media, and when an oxidizing solution, the temperature of the solution. With specific chromic acid-sulfuric acid solutions shown in FIG. 2, optimum results will be gained as indicated, with the contact from about one to about three minutes in a solution maintained at a temperature from 125° F. to the softening point of the resin surface, preferably from about 140° F. to about 160° F., with residence time in the solution increasing with a decrease in solution temperature.

With proper selection of the oxidizing media, no perceptible effect need be observed on the surface of the preconditioned article. The effects, however, are significant. When the article is subsequently conditioned in the organic pre-etch solution the pre-etched solution will sheet and completely drain from the surface of the article when it is withdrawn from the organic pre-etch bath even though any change in the surface character of the article as a consequence of pre-conditioning operation may be removed during the organic pre-etch operation.

We have observed that the article when it is once again dipped into the water rinse which normally follows organic pre-etch, may revert back to its hydrophobic nature and any effect produced presumably lost. This is unimportant since the phenomenon produced as a consequence of pre-conditioning remains effective during a critical period of time when an article is being transferred from the organic pre-etch solution to a subsequent rinse or quenched bath.

Articles pre-conditioned in accordance with the practice of this invention are free from surface depressions or blemishes caused by droplets which normally form on the surface of the article when it is withdrawn from the pre-etch solution and which continue to locally etch the article during transfer to a rinse solution.

While proper pre-conditioning has, as will be shown in the examples, a most beneficial effect upon appearance of the electroless plated articles, it does not appear to affect in any material way the bonding strength of the electroless deposited metal coating.

Figure 1:
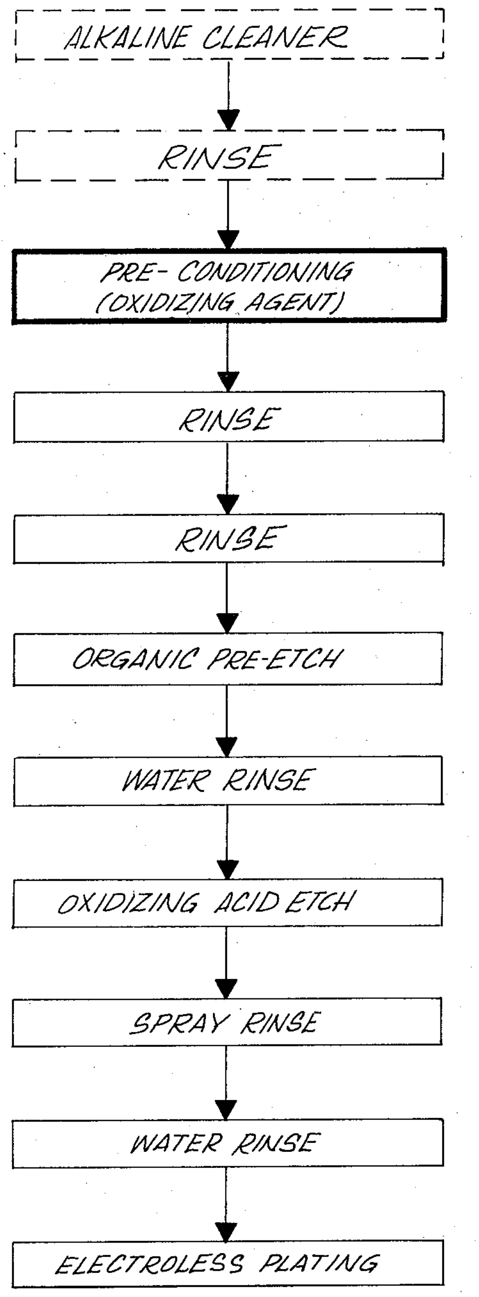
FIG. 1 is a schematic representation of a typical electroless plating operation and including the additional operation practices to pre-condition the surface of the ABS resin.

For a greater appreciation for the invention, the preconditioning of an ABS resin surface will be described in terms of the total processing of an ABS resin article up to electroless plating steps as applied to maximize the ultimate bond strength of the electrolessly deposited metal to the ABS resin substrate. This treating procedure is schematically shown in FIG. 1. With reference thereto, the articles to be treated may be optionally washed in an alkaline cleanser, generally maintained at a temperature of about 130° F. to remove any grease or oil present on the surface of the articles. Residence time is short, generally only about from one to two minutes. This step and/or the subsequent water rinse, may be eliminated where the articles are obtained grease-free. If the article is cleansed with an alkaline cleanser, it is rinsed with water to prevent carryover of the alkaline cleanser to the pre-conditioning stage.

The next step in the process involves pre-conditioning with an oxidizing media which will increase hydrophilic character of the surface.

As already indicated, pre-conditioning where a liquid oxidizing agent is employed, is generally carried out at an elevated temperature to enhance the conditioning rate. Residence time during pre-conditioning, however, may vary widely depending on the nature of the oxidizing agent used and the conditioning temperature. Where the oxidizing agent is a liquid, the article is rinsed one or more times in water preferably a de-ionized water to remove any excess oxidizing agents which may cling to the surface. Since the surface is more hydrophilic, the water will readily sheet and rinse cleanly therefrom.

To minimize the possibility of carryover of the oxidizing agent to the organic etch solution two rinsing operations are preferably performed. The first, to remove the bulk of carryover conditioning agent and the second, as a final rinse to remove any residue to assure there will be little or no drag-in of the oxidizing agent to the organic pre-etch stage.

Following pre-conditioning the ABS resin article with its more hydrophilic surface is then passed to an organic pre-etch stage where it is conditioned for a time sufficient to at least deglaze and satinize the surface of the article.

The preferred organic pre-etch solutions used for the conditioning of the ABS resin surface are solutions containing as the dominant etchants one or more of the compounds glycol diacetate, glycol monoacetate, propylene glycol acetate, methyl Cellosolve acetate, carbitol acetate, and methyl acetoacetate, with glycol diacetate being particularly preferred.

These etchants are normally dissolved in a media substantially inert with respect to the ABS resins. The media used may vary widely and include among others water, weak acids such as acetic acid, alcohols, glycol, glycol ethers and the like, as well as mixtures thereof. Water, for economic reasons, is preferred.

Where the glycol acetate solutions are used, it is preferred that the pre-etch solution have a glycol diacetate concentration within four percent of solution saturation as this maximizes the ultimate bond strength of the electrolessly deposited metal to the ABS resin surface.

Pre-etch treatment with aforementioned solutions is normally for ½ to about 3 minutes at a temperature of from about 90° F. to about 130° F.

Although the aforementioned organic pre-etch solutions are preferred because of their ability to deglaze and satinize the surface of the article, there may also be used within the ambit of this invention, an "ABS solvent" as defined in U.S. Pat. No. 3,445,350 incorporated herein by reference.

Independent of which organic pre-etch solution is used, it is, as indicated, when the article is withdrawn from the organic pre-etch solution that the merits of pre-conditioning are established. Instead of the pre-etch solution forming into droplets on the surface of the ABS-resin it sheets and cleanly drains from the surface to prevent, thereby, localized erosion of the surface as a consequence of formation of droplets, thereon.

After organically etching surface of the ABS resin the article may then be simply rinsed and passed to a strong oxidizing acid, chromic acid, sulfuric acid, or mixtures thereof where the butadiene portion of the ABS resin is attacked and then on to a conventional electroless plating operation such as that set forth, for example, in U.S. Pat. No. 2,874,072 issued Feb. 17, 1959.

Following electroless plating the ABS article may then be electrolytically plated by conventional means with copper, nickel, gold, silver, chromium and the like to provide the desired finish on the article.

The ABS resin article having improved bond strength as a consequence of organic pre-etch will not be marred with surface defects because of pre-conditioning to render its surface more hydrophilic prior to contact with the organic pre-etch solution.

Example 1

A pre-conditioning tank and two water rinse tanks were installed ahead of an organic pre-etch tank containing a glycol diacetate in which the glycol diacetate concentration was within 4% of solution saturation.

The pre-conditioning tank contained 184 gr./liter $H_2SO_4$ and 540 gr./liter $CrO_3$.

ABS resin articles molded from Cycolac Ep 3510, a plating grade of resin manufactured by Marbon Chemical Company, were racked on elevator, side arm return automatic plating machine having a 15 second transfer time between tanks.

The articles were rinsed in an alkaline cleaning tank and a water rinse, then the pre-conditioning tank where the sulfuric acid/chromic acid mixture was maintained at 145° F. Residence time was three minutes.

After conditioning, the articles were rinsed twice in water tanks and passed to the organic pre-etch tank where the solution was maintained at 105° F. Residence time was two minutes.

After organic pre-etch the parts were rinsed in water, oxidized in chromic acid solution and electrolessly plated with copper. The copper was then electroplated with chromium.

None of the parts had organic pre-etch defects on the surface.

Example 2

The procedure of Example 1 with parts from the same batch was repeated except that immersion time in the pre-conditioning tank was reduced to 1.5 minutes. The results were the same.

CONTROL

The procedure of Example 1 was repeated using parts from the same batch except that acid pre-conditioning and the two water rinses following it were eliminated from the cycle. All of the parts showed surface defects due to incomplete drainage of the organic pre-etch from the parts.

What is claimed is:

1. In a process for electroless plating of acrylonitrile-butadiene-styrene resin with a metal which includes the steps of contacting the resin surface with an organic pre-etch solution prior to contact with a strong oxidizing acid to promote adhesion of electrolessly deposited metal; the improvement which comprises conditioning the acrylonitrile-butadiene-styrene resin surface with an oxidizing media therefor for a time sufficient to increase hydrophilic properties of the surface of said ABS resins prior to contact of the ABS resin surface with the organic pre-etch solution.

2. A process as claimed in claim 1 in which the oxidizing media is a solution comprising about 540 grams per liter $CrO_3$ and about 184 grams per liter $H_2SO_4$.

3. A process as claimed in claim 2 in which conditioning is carried out at a temperature of from 120° F. to the softening point of the ABS resin surface.

4. A process as claimed in claim 3 in which residence time in oxidizing media is from about 1 to about 3 minutes.

5. A process as claimed in claim 1 in which the oxidizing media is selected from the group consisting of sulfuric acid, chromic acid and mixtures thereof.

6. A process as claimed in claim 5 in which the sulfuric acid-chromic acid concentrations in the oxidizing media are within a zone between and including a pair of curves plotted from the following values:

| $H_2SO_4$ (g./l.) | $CrO_3$ (g./l.) Upper value | $CrO_3$ (g./l.) Lower value |
|---|---|---|
| 0 | 1,040 | |
| 46 | 900 | 600 |
| 92 | 800 | 520 |
| 184 | 680 | 400 |
| 368 | 472 | 240 |
| 552 | 250 | 135 |
| 736 | 80 | 40 |
| 920 | 20 | 10 |
| 1,840 | 0 | |

7. A process as claimed in claim 6 in which conditioning is carried out at a temperature of from 120° F. to the softening point of the ABS resin surface.

8. A process as claimed in claim 6 in which conditioning is carried out at a temperature of about 140° F. to about 160° F.

9. A process as claim in claim 5 in which conditioning is carried out at a temperature of from 120° F. to the softening point of the ABS resin surface.

10. A process as claimed in claim 9 in which residence time in oxidizing media is from about 1 to about 3 minutes.

References Cited

UNITED STATES PATENTS

| | | | |
|---|---|---|---|
| 3,445,350 | 5/1969 | Klinger et al. | 117—47 A |
| 3,574,070 | 4/1971 | Sahely | 117—47 A |
| 3,567,532 | 3/1971 | Jezl et al. | 117—47 A |
| 3,547,785 | 12/1970 | Sakomg | 117—47 A |

RALPH S. KENDALL, Primary Examiner

J. A. BELL, Assistant Examiner

U.S. Cl. X.R.

117—160 R; 156—2; 204—30